United States Patent [19]

Stahl

[11] Patent Number: 4,558,186
[45] Date of Patent: Dec. 10, 1985

[54] SINGLE POWER SUPPLY BATTERY FEED CIRCUIT

[75] Inventor: Douglas C. Stahl, Downers Grove, Ill.

[73] Assignee: GTE Automatic Electric Incorporated, Northlake, Ill.

[21] Appl. No.: 529,414

[22] Filed: Sep. 6, 1983

[51] Int. Cl.$^4$ .................... H04B 3/03; H04M 19/00
[52] U.S. Cl. ...................... 179/170 NC; 179/77; 330/301; 323/268
[58] Field of Search .......... 179/170 NC, 170 R, 16 F, 179/18 FA, 70, 77; 323/268; 330/301, 275, 295

[56] References Cited

U.S. PATENT DOCUMENTS 4,041,252 8/1977 Cowden .................. 179/170 NC
4,241,239 12/1980 Pernyeszi .................. 179/70
4,387,273 6/1983 Chea, Jr. .................. 179/16 F

OTHER PUBLICATIONS

"Fully Electronic TD-PABX Techniques", Y. Morikawa, International Conference on Private Electronic Switching Systems, Apr. 10–12, 1978.

Primary Examiner—Gene Z. Rubinson
Assistant Examiner—R. Vaas
Attorney, Agent, or Firm—Charles A. Doktycz

[57] ABSTRACT

A two amplifier subscriber line interface circuit that uses a novel voltage divider technique for providing power to the two lower voltage amplifiers from a 50 volt central office battery. This is achieved by using one lower power amplifier with a Zener regulator diode in shunt thereof to regulate its current.

6 Claims, 1 Drawing Figure

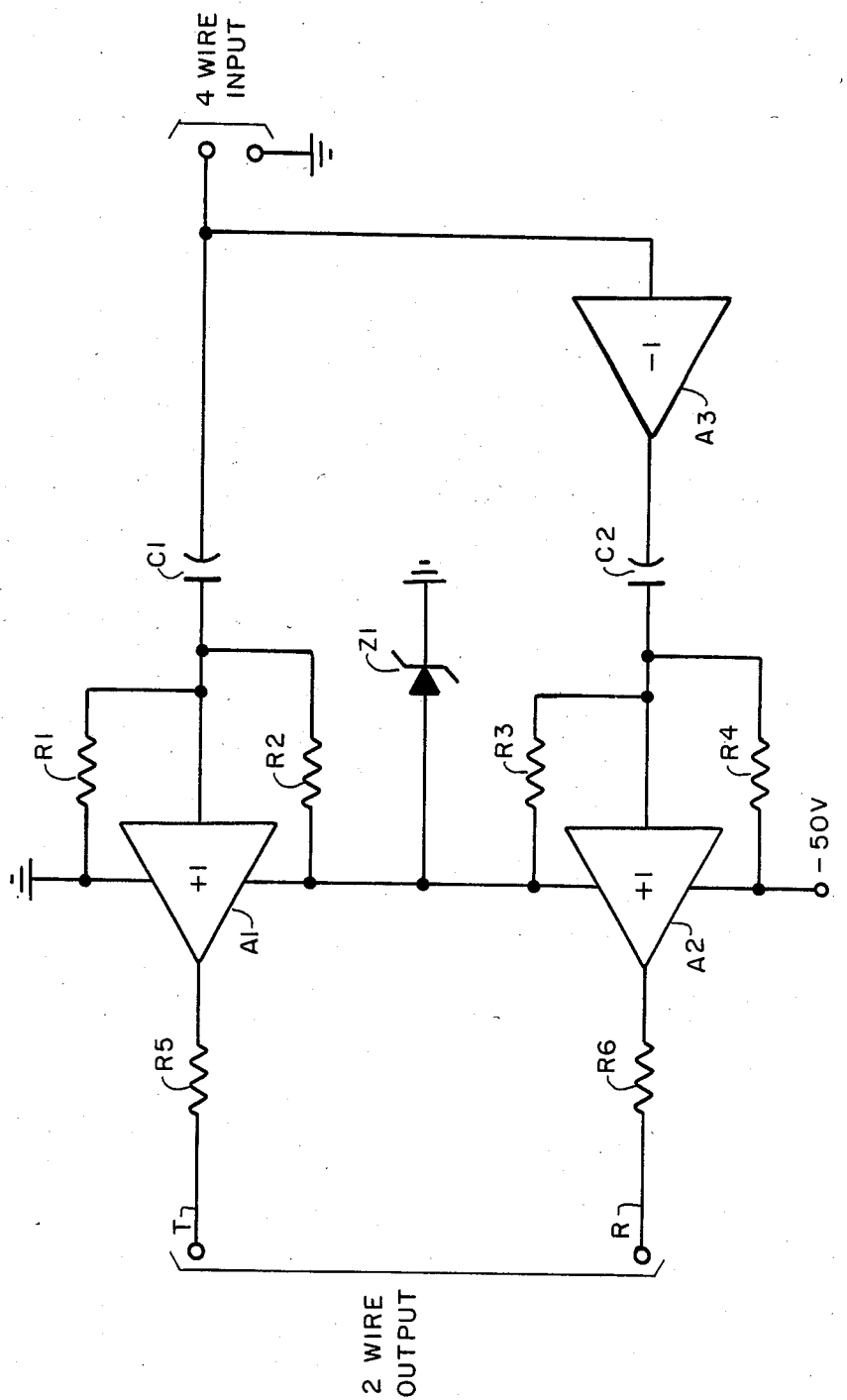

SINGLE POWER SUPPLY BATTERY FEED CIRCUIT

FIELD OF THE INVENTION

The present circuit relates generally to telecommunication line circuitry and more specifically to circuitry for reducing the power dissipation in telephone subscriber line circuits with a consequent reduction in the total amount of power consumed by a central office.

BACKGROUND OF THE INVENTION

Before electronic battery feed circuits existed, a hybrid transformer was used to convert a balanced two wire signal from an unbalanced four wire signal. In the last few years there has been a considerable amount of effort, however, to replace the hybrid transformer due to its size, weight and cost. With the advent of electronic battery feed circuits, there is a further need to reconfigure the hybrid circuit so that it will be suitable for newer electronic battery feed circuit designs. Present state-of-the-art does not permit an inexpensive solution to this problem, primarily due to the high voltages involved. The −50 volt office battery, which is used to provide power, exceeds the voltage rating of most semiconductor devices on the market today.

The problem of designing a circuit to withstand the higher voltages of an office battery has generally been approached in one of three ways. First, a semiconductor integrated circuit which uses a manufacturing process that can operate at higher voltages can be designed. This is an expensive solution, however. Second, an intermediate power supply, with a voltage of about half of the office battery, can be added to the office power supply. This, however, necessitates additional equipment, power buses, wire routing and connectors. Third, one can derive an intermediate, secondary voltage from the −50 v battery by using Zener diodes, or some other voltage regulating device. Higher power consumption will result from this technique, however.

The present invention falls into the third category of deriving a secondary voltage from the −50 volt battery. Since operational amplifiers are not normally capable of handling the battery voltages found in a central office, the two operational amplifiers are placed in series, and two Zener diodes are used to provide a lower stable supply voltage which the operational amplifiers can safely use. Using a −50 volt battery, such a circuit configuration will consume about 170 milliwatts of power.

SUMMARY OF THE INVENTION

The object of the present invention is to provide a low cost, novel, reliable and maintenance free technique to efficiently provide power to a line using the relatively high voltage of the central office battery. This novel circuit technique uses three components: a standard operational amplifier, a low power operational amplifier, and a Zener diode. The voltage rating of the operational amplifiers may be only 30 volts, and the breakdown voltage rating of the Zener diode in the range from 26 to 29 volts.

Power is provided to the two operational amplifiers in a manner where one operational amplifier is powered near ground, and the other near the office battery voltage of −50 volts. This invention uses an arrangement where the two operational amplifiers are wired together so that their power leads are connected in series with the central office battery. That is, the positive power lead of the tip driver operational amplifier is connected to ground. Similarly, the negative power lead of the ring driver operational amplifier is connected to the central office battery. Then, the positive power lead of the ring driver operational amplifier and the negative power lead of the tip driver operational amplifier are tied together. This point, where the power leads of the two operational amplifiers are tied together, has a shifting voltage, and this voltage can vary tremendously. In order to prevent this floating voltage from destroying either of the operational amplifiers, a voltage regulator, a Zener diode, for example, must be applied between this floating voltage point and a stable reference voltage. The reference voltage can be ground, a battery voltage, or some other reference voltage. The voltage regulator, therefore, will provide a stable voltage for the operation of the operational amplifiers.

Unfortunately, any voltage regulator takes power to operate. The regulator power, in fact, can almost double the total power consumption of a battery feed circuit that were to use this type of approach. The proposed solution to this problem is to use one low power operational amplifier, and one standard operational amplifier. The difference between these two operational amplifiers is the standard operational amplifier draws more current than the low power one. Because the supply current flows through both operational amplifiers in series, the standard operational amplifier will try to force the low power operational amplifier to draw more current. If one puts a Zener diode in parallel with the low power operational amplifier, the excess current will flow through the Zener diode. Since a Zener diode will drop a constant voltage regardless of the current (as long as a minimum current is present), this method provides an effective means of regulating the floating voltage. Thus, this invention can reduce the amount of power consumed without the penalties of using an expensive manufacturing process or using additional power supplies.

BRIEF DESCRIPTION OF THE DRAWING

The drawing FIGURE is a simplified blockdiagram of a single power supply battery feed circuit according to the invention.

DESCRIPTION OF THE PREFERRED EMBODIMENT

Referring to FIG. 1, there are three major components in describing the invention. These three components are: a low power analog amplifier A1, a standard analog amplifier A2 and a Zener diode Z1. The two analog amplifiers provide DC loop current as well as an AC signal to the telephone line. The Zener diode is used to clamp the intermediate voltage between the two analog amplifiers to a fixed value.

FIG. 1 has other components besides those mentioned above. The resistors R5 and R6 at the signal output terminations of each analog amplifier are line impedance matching resistors, and are used to match the interface circuit with the telephone line impedance. The combination of the two resistors and one capacitor at the signal input termination of each analog amplifier serves to set the proper DC bias to the amplifier and to pass the receive signal to the amplifier from the four wire receive port. These resistors are large in value. The capacitors C1 and C2 are also large in value, so that the AC signal can pass through to the input of the analog amplifier unattenuated. The last component to be mentioned in FIG. 1 is the inverter amplifier A3. The input of the inverter is connected to the four wire receive port. The output of the inverter feeds an inverted version of the receive signal to the input of the analog amplifier A2. The purpose of the inverter is to provide an inverted signal to the analog amplifier A2 so that a differential AC signal is sent down the telephone line. The subscriber will then receive this differential AC signal in the form of a voice or digital communication.

Returning to a discussion of the two analog amplifiers, these two components are responsible for driving the telephone line by using the four wire receive signal. In FIG. 1, these analog amplifiers are shown as unity gain buffer amplifiers. They don't have to be set at unity gain, however. A positive or negative feedback approach using operational amplifiers could be implemented. It is important that the analog amplifiers have a DC bias reference, so that the DC current draw will flow through the top lead to the subscriber termination and back through the ring lead, regardless of the presence or absence of an AC signal on the telephone line. In FIG. 1, the tip analog amplifier A1 has its positive current supply terminal biased at ground from a positive current supply terminal, and the ring analog amplifier A2 has its negative current supply terminal biased near the battery voltage of 50 volts.

The low power analog amplifier A1 and the Zener diode Z1 are at the heart of this invention. By connecting these two components in parallel, one can establish a fixed supply voltage for the low power analog amplifier, and, at the same time, one can establish a minimum current for the Zener diode Z1. Thus the Zener diode Z1 has the anode terminal connected from between the amplifier A1 and A2 respective negative and positive current supply terminals, and the cathode terminal to ground. The standard analog amplifier A2 connected to these two components must sink the current of the low power analog amplifier A1 and the Zener diode Z1 under all loads. Generally, this is not a problem, because whatever current is sent out to the subscriber loop must pass through both analog amplifiers as well. If no current is sent through the loop, which would happen if the phone was on-hook, then the standard analog amplifier would still sink the current of the low power analog amplifier and the Zener diode. The basis for this type of operation is the fact that the low power analog amplifier runs on less current under all loads. If, for some reason, the standard analog amplifier was not sinking enough current to keep the Zener diode in regulation, then a small dummy load could be connected to the analog amplifier to prevent such an occurrence.

A typical arrangement of the invention found to be operative uses the following values of components.

| Reference | Value |
| --- | --- |
| C1 | .15 of capacitor |
| A1 | TL062 amplifier (low power) |
| A2 | 741 amplifier |
| A3 | 741 inverter |
| Z1 | 27V Zener diode |
| R1, R2, R3, R4 | 120K ohms resistor |
| R5, R6 | 300 ohms resistor |

What is claimed is:

1. A circuit for use in a transformerless hybrid arrangement for coupling an input terminal pair to a two wire communication path having first and second terminal said circuit including;
    a DC battery voltage source including a positive terminal and a negative terminal and,
    a direct current battery feed arrangement for said two wire communication path comprising:
    a first low current amplifier including a signal input and a signal output termination and including a positive and a negative current supply terminal,
    a second relatively higher current level amplifier including a signal input and a signal output termination and including a positive and a negative current supply terminal,
    first means connecting said first amplifier positive current supply terminal to the positive terminal of said DC battery voltage source,
    second means connecting said second amplifier negative current supply terminal to the negative terminal of said DC battery source,
    a voltage regulator, and means connecting said first amplifier negative current supply terminal to said second amplifier positive supply terminal to complete a series path to conduct a series current across said voltage source terminals,
    said voltage regulator connected across said first amplifier negative and positive current supply terminals to thereby shunt a portion of said series current flow from said first amplifier and maintain a constant voltage across said first amplifier current supply terminals,
    said second amplifier operated to conduct said series current of said series path unshunted by a regulator.

2. A circuit for use in a transformerless hybrid arrangement as claimed in claim 1 wherein said voltage regulator comprises a Zener diode having an anode and a cathode, with said anode connected to said first amplifier negative current supply terminal and said cathode to said positive current supply terminal of said first amplifier.

3. A circuit for use in a transformerless hybrid arrangement as claimed in claim 1 further including an impedance matching resistor in series between each of said first and second amplifier output terminals respectively with said first and second terminals of said two wire path.

4. A circuit for use in a transformerless hybrid arrangement as claimed in claim 1 further including a first capacitor coupling one terminal of said input terminal pair to said first amplifier signal input and a second capacitor and an inverter in series coupling said one terminal of said input terminal pair to said second amplifier signal input.

5. A circuit for use in a transformerless hybrid arrangement as claimed in claim 4 further including a first resistor operatively connected between said first amplifier signal input and the positive terminal of said DC battery source, and a second resistor operatively connected between said first amplifier signal input and said first amplifier negative supply terminal.

6. A circuit for use in a transformerless hybrid arrangement as claimed in claim 5 further including a third and a fourth resistor respectively connected from said second amplifier signal input with the positive supply terminal of said second amplifier and with the negative terminal of said DC battery source.

* * * * *